(12) United States Patent
Suzuki

(10) Patent No.: US 7,015,946 B2
(45) Date of Patent: Mar. 21, 2006

(54) TELEVISION DOOR INTERCOM APPARATUS

(75) Inventor: Tsuyoshi Suzuki, Nagoya (JP)

(73) Assignee: Aiphone Co., Ltd., (JP)

( * ) Notice: Subject to any disclaimer, the term of this patent is extended or adjusted under 35 U.S.C. 154(b) by 493 days.

(21) Appl. No.: 10/130,699

(22) PCT Filed: Apr. 12, 2002

(86) PCT No.: PCT/JP02/03653

§ 371 (c)(1),
(2), (4) Date: May 22, 2002

(87) PCT Pub. No.: WO03/088636

PCT Pub. Date: Oct. 23, 2003

(65) Prior Publication Data

US 2003/0193563 A1 Oct. 16, 2003

(51) Int. Cl.
*H04N 7/18* (2006.01)

(52) U.S. Cl. ................................. 348/156; 348/143
(58) Field of Classification Search ......... 348/143–160
See application file for complete search history.

(56) References Cited

U.S. PATENT DOCUMENTS

| | | | | |
|---|---|---|---|---|
| 4,355,329 A | * | 10/1982 | Yoshida et al. | 348/143 |
| 4,524,384 A | * | 6/1985 | Lefkowitz et al. | 348/156 |
| 5,657,380 A | * | 8/1997 | Mozer | 379/88.01 |
| 6,049,598 A | * | 4/2000 | Peters et al. | 379/102.06 |
| 6,069,655 A | * | 5/2000 | Seeley et al. | 348/154 |
| 6,233,328 B1 | * | 5/2001 | Wolf | 379/159 |
| 6,256,479 B1 | * | 7/2001 | Hoffmann et al. | 455/78 |
| 6,466,261 B1 | * | 10/2002 | Nakamura | 348/151 |
| 6,624,750 B1 | * | 9/2003 | Marman et al. | 340/506 |

FOREIGN PATENT DOCUMENTS

JP 04-130852 1/1992

* cited by examiner

*Primary Examiner*—Andy Rao
(74) *Attorney, Agent, or Firm*—Lorusso & Loud

(57) ABSTRACT

A television door intercom apparatus improves recognition performance for a resident inside a house to recognize a visitor conducting a call operation at the entrance and security in responding to the call. A call detection circuit 31 of a residential master station 2 detects a call when a visitor pushes a call button 11 of a door intercom substation 1, activates a signal generator circuit 32 and causes a master station speaker 39 to output a call sound so that a communication can be exchanged between a substation microphone 16 and a substation speaker 17 of the door intercom substation and a master station microphone 38 and the master station speaker of the residential master station. When a picture monitor 36 of the residential master station displays a picture taken by a camera 13 of the door intercom substation, the residential master station further includes a message transmission circuit 34 activated when the call detection circuit detects the call, for causing the substation speaker to output a message content of a message storage circuit 33 storing in advance a predetermined message.

5 Claims, 8 Drawing Sheets

TELEVISION DOOR INTERCOM APPARATUS

TECHNICAL FIELD

This invention relates to a television door intercom apparatus. More particularly, the invention relates to a television door intercom apparatus that improves recognition performance for a resident inside a house to recognize a visitor pushing a call button at the entrance for a call operation, and security in responding to the call.

BACKGROUND OF THE INVENTION

A television door intercom apparatus having a construction shown in a block diagram of FIG. 7 has been proposed in the past as a television door intercom apparatus of this kind.

The television door intercom apparatus shown in the drawing has a door intercom substation 501 installed at the entrance and including a control circuit (hereinafter called a "substation CPU) 510, a call button 511, a call detection circuit (hereinafter called a "substation call detection circuit) 512, a camera 513, a picture processing circuit 514, a picture modulation circuit 515, a substation microphone 516, a substation speaker 517, a communication circuit (hereinafter called a "substation communication circuit") 518 and a transmission interface circuit (hereinafter called a "substation transmission I/F") 519, and a residential master station 502 installed inside a house and including a control circuit (hereinafter called a "master station CPU) 520, a call detection circuit (hereinafter called a "master station call detection circuit) 521, a signal generator circuit 522, a picture demodulation circuit 523, a picture monitor 524, a communication on/off switch 525, a master station microphone 526, a master station speaker 527, a communication circuit (hereinafter called a "master station communication circuit") 528 and a transmission interface circuit (hereinafter called a "master station transmission I/F") 529. The door intercom substation 501 and the residential master station 502 are connected to each other through a transmission line L501 having two wires.

When a visitor at the entrance pushes down the call button 511 of the door intercom substation 501 to call a resident inside the house in the television door intercom apparatus having the construction described above, the substation call detection circuit 512 detects this operation and outputs a call signal. The call signal is transmitted to the master station CPU 520 through the substation CPU 510, the substation transmission I/F 519, the transmission line L501 and the master station transmission I/F 529 of the residential master station 502.

The master station CPU 520 of the residential master station 502 detects the call signal from the door intercom substation 501, outputs the call signal to the master station call detection circuit 521 and activates the picture demodulation circuit 523 and the picture monitor 524. The master station call detection circuit 521 detects the call of the visitor at the entrance on the basis of the call signal transmitted through the master station CPU 520 and activates the call signal generator circuit 522. The signal generator circuit 522 causes the master station speaker 527 to output call sound to notify the resident inside the house of the call.

The camera 513, the picture processing circuit 514 and the picture modulation circuit 515 of the door intercom substation 501 are operated under the control of the substation CPU 510 on the basis of power (not shown and not explained in detail) supplied through a reverse route of the call signal under the control of the master station CPU 520 of the residential master station 502 detecting the call signal. The picture of the visitor taken by the camera 513 is appropriately signal-processed (modulation, demodulation, etc) through the picture processing circuit 514, the picture modulation circuit 515, the substation transmission I/F 519, the transmission line L501, the master station transmission I/F 529 of the residential master station 502 and the picture demodulation circuit 523, and is displayed on the picture monitor 524.

The resident inside the house judges the visitor conducting the call operation at the entrance on the basis of the call sound from the master station speaker 527 and the picture displayed on the picture monitor 524 of the residential master station 502, and then pushes the communication on/off switch to establish the communication with the visitor (bi-directional communication by sound; not explained in detail).

In the television door intercom apparatus according to the prior art, however, a predetermined field-of-view angle is set to the camera 513 of the door intercom substation 501 for taking the picture of the visitor conducting the call operation at the entrance as shown in an operation explanatory view of FIG. 8. Therefore, when the visitor is intentionally or unintentionally out of the range of the field-of-view angle of the camera 513, the picture monitor 524 of the residential master station 502 cannot display the picture of the visitor or displays only a cut picture. Consequently, recognition performance for the resident who judges the visitor on the basis of this picture drops, and security of the resident who responds to a call of a stranger, for example, drops, too.

DISCLOSURE OF THE INVENTION

To solve these problems, this invention aims at providing a television door intercom apparatus that, with urging a visitor to move into a range of a field-of-view angle of a camera of a door intercom substation when the visitor conducts a call operation at the entrance, detects whether or not the visitor is within the range of the field-of-view angle of the camera, improves recognition performance of a resident judging the visitor on the basis of the picture displayed on a picture monitor of a residential master station by urging the visitor to move into the range of the field-of-view angle when the visitor is out of the range of the field-of-view angle, and improves also security when the resident responds to the call.

To accomplish the objects described above, the invention provides a television door intercom apparatus of a type in which a call detection circuit of a residential master station detects a push operation of call button of a door intercom substation by a visitor, activates a signal generator circuit and causes a master station speaker to output a call sound so that a communication can be exchanged between a substation microphone and a substation speaker of the door intercom substation and a master station microphone and the master station speaker of the residential master station, and a picture monitor of the residential master station displays a picture taken by a camera of the door intercom substation, wherein the residential master station includes a message transmission circuit activated when the call detection circuit detects the call, for causing the substation speaker to output a message content of a message storage circuit storing in advance a predetermined message.

According to another aspect of the invention, the invention provides a television door intercom apparatus of a type in which a call detection circuit of a residential master station detects a push operation of call button of a door intercom substation by a visitor, activates a signal generator circuit and causes a master station speaker to output a call sound so that a communication can be exchanged between a substation microphone and a substation speaker of the door intercom substation and a master station microphone and the master station speaker of the residential master station, and a picture monitor of the residential master station displays a picture taken by a camera of the door intercom substation, wherein the door intercom substation includes a passive sensor for outputting an out-of-field-of-view-angle signal when the visitor is outside the range of a field-of-view angle of the camera, and the residential master station includes a sensor detection circuit for detecting an out-of-field-of-view-angle signal and a message transmission circuit activated when the call detection circuit detects the call, for causing the substation speaker to output a message content of a message storage circuit storing in advance a predetermined message.

According to still another aspect of the invention, the invention provides a television door intercom apparatus of a type in which a call detection circuit of a residential master station detects a push operation of call button of a door intercom substation by a visitor, activates a signal generator circuit and causes a master station speaker to output a call sound so that a communication can be exchanged between a substation microphone and a substation speaker of the door intercom substation and a master station microphone and the master station speaker of the residential master station, and a picture monitor of the residential master station displays a picture taken by a camera of the door intercom substation, wherein the residential master station includes a picture amount comparison circuit for outputting an out-of-field-of-view-angle signal representing that the visitor is outside the range of a field-of-view angle of the camera when a picture amount of a picture displayed by the picture monitor is smaller than a predetermined reference picture amount, and a message transmission circuit activated by the out-of-field-of-view-angle signal, for causing the substation speaker to output a message content of a message storage circuit storing in advance a predetermined message.

In the television door intercom apparatus described above, the substation speaker of the door intercom substation outputs the message content read out from the message storage circuit and transmitted from the message transmission circuit under the control of the call detection circuit of the residential master station detecting the call operation of the call button of the door intercom substation by the visitor at the entrance, or under the control of the sensor detection circuit of the residential master station detecting from the out-of-field-of-view-angle of the passive sensor that the visitor is out of the range of the field-of-view angle of the camera of the door intercom substation or under the control of the picture amount of the picture displayed on the picture monitor of the residential master station, or under the control of the picture amount comparison circuit detecting that the visitor is out of the range of the field-of-view angle of the camera of the door intercom substation, and urges the visitor to move into the range of the field-of-view angle of the camera. Consequently, recognition performance of the visitor by the resident inside the house who judges the visitor conducting the call operation at the entrance on the basis of the call sound from the master speaker and the picture displayed on the picture monitor of the residential master station can be improved, and security of the resident in responding to the call by a stranger, for example, can be improved, too.

BEST MODE FOR CARRYING OUT THE INVENTION

Television door intercom apparatuses according to several preferred embodiments of the invention will be explained hereinafter with reference to the accompanying drawings.

Figure 1:
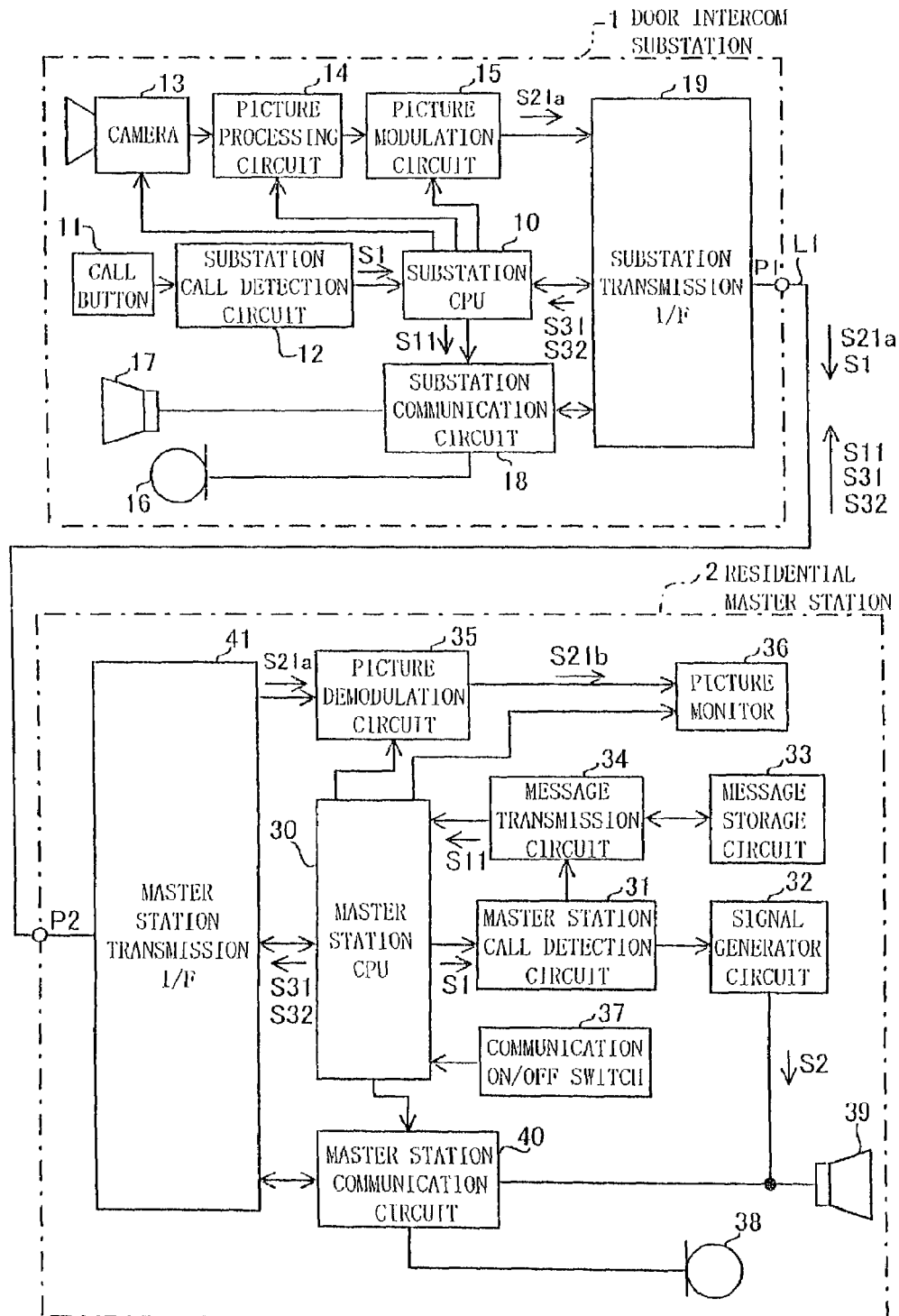
FIG. 1 is a block diagram showing a construction of a television door intercom apparatus according to a first embodiment of the invention.

FIG. 1 is a block diagram showing a construction of a television door intercom apparatus according to a first embodiment of the invention. This apparatus includes a door intercom substation 1 installed at the entrance and a residential master station 2 installed inside a room. The door intercom substation 1 and the residential master station 2 are connected to each other through a transmission line L1 having two wires.

The door intercom substation 1 includes a control circuit (hereinafter called "substation CPU") 10 for controlling the door intercom substation, a call button 11 operated by a visitor at the entrance to call a resident, a call detection circuit (hereinafter called a "substation call detection circuit") 12 for detecting the push operation of the call button 11 and outputting a call signal, a camera 13 for imaging the visitor pushing the call button 11, a picture processing circuit 14 for processing the picture taken by the camera 13 into electric signals, a picture modulation circuit 15 for modulating (for executing FM modulation of) the electric picture signals processed by the picture processing circuit 14, a substation microphone 16 for picking up a communication of the visitor to the resident, a substation speaker 17 for outputting the communication sound between the visitor and the resident and a later-appearing message content, a communication circuit (hereinafter called "substation communication circuit") 18 for appropriately processing (4 line/2 line conversion and 2 line/4 line conversion) the communication signals constituting the communication sound of the substation speaker 17 and forming a communication path, and a transmission interface circuit (hereinafter called a "substation transmission I/F") 19 for respectively forming signal transmission lines that connect the substation CPU 10, the picture modulation circuit 15, the substation communication circuit 18 and the transmission line L1 connected to a transmission line connection terminal P1, and executing appropriate signal processing (multiplexing and isolation) of these signals so that the signals can be transmitted and received.

The residential master station 2 includes a control circuit (hereinafter called a "master station CPU") 30 for controlling the residential master station, a call detection circuit (hereinafter called a "master station call detection circuit") 31 for detecting the call of the visitor at the entrance on the basis of the call signals from the door intercom substation 1, a signal generator circuit 32 activated under the control of the master station detection circuit 31 detecting the call, for outputting call sound signals for outputting the call sound from a later-appearing master station speaker 39, a message storage circuit 33 storing in advance a predetermined message that urges the visitor conducting the push operation to stand in front of the door intercom substation 1 and to move into the range of the field-of-view angle of the camera 13, a message transmission circuit 34 activated under the control of the master station call detection circuit 31 detecting the call, for outputting a message signal generated by appropriately processing the message read out from the message storage circuit 33 and causing the substation speaker 17 of the door intercom substation 1 to output the message content, a picture demodulation circuit 35 for demodulating (FM demodulation) the picture signals from the door intercom substation 1, a picture monitor 36 for displaying the picture of the visitor on the basis of the picture signals demodulated by the picture demodulation circuit 35, a communication on/off switch 37 for allowing the resident to respond to the call of the visitor and finishing the communication with the visitor, a master station microphone 38 for allowing the resident to pick up the communication sound with the visitor, a master station speaker 39 for outputting the communication sound between the resident and the visitor and the call sound described above, a communication circuit (hereinafter called a "master station communication circuit") 40 for appropriately processing (4 line/2 line conversion and 2 line/4 line conversion) the communication signals constituting the communication sound of the master station speaker 39 and forming a speech path, and a transmission interface circuit (hereinafter called a "master station transmission I/F") 41 for respectively forming signal transmission lines that connect the master station CPU 30, the picture demodulation circuit 35, the master station communication circuit 40 and the transmission line L1 connected to a transmission line connection terminal P2, and executing appropriate signal processing (multiplexing and isolation) of these signals so that the signals can be transmitted and received.

The operation of the television door intercom apparatus according to the first embodiment of the invention that has the construction described above will now be explained.

Referring to the block diagram of FIG. 1, when the visitor at the entrance pushes the call button 11 of the door intercom substation 1 to call the resident inside the house, the substation call detection circuit 12 detects this operation and generates the call signal S1. The call signal S1 is transmitted to the master station CPU 30 through the substation CPU 10, the substation transmission I/F 19, the transmission line connection terminal P1, the transmission line L1, the transmission connection terminal P2 of the residential master station 2 and the master station transmission I/F 41.

Detecting the call signal S1 from the door intercom substation 1, the master station CPU 30 of the residential master station shifts from the standby state to the call state, outputs this call signal to the master station call detection circuit 31 and activates the picture demodulation circuit 35 and the picture monitor 36. The master station call detection circuit 31 detects the call of the visitor at the entrance on the basis of the call signal S1 and activates the signal generator circuit 32 and the message transmission circuit 34. The signal generator circuit 32 outputs the call sound signal S2, causes the master station speaker 39 to output the call sound and notifies the resident inside the house of the call. Further, the message transmission circuit 34 reads out a predetermined message stored in advance in the message storage circuit 33 such as the message "Please stand in front of the door intercom substation", and outputs a message signal S11 that is appropriately processed. This message signal S11 is transmitted to the substation CPU 10 through the master station CPU 30, the master station transmission I/F 41, the transmission line connection terminal P2, the transmission line L1, the transmission line connection terminal P1 of the door intercom substation 1 and the substation transmission I/F 19.

Figure 4:
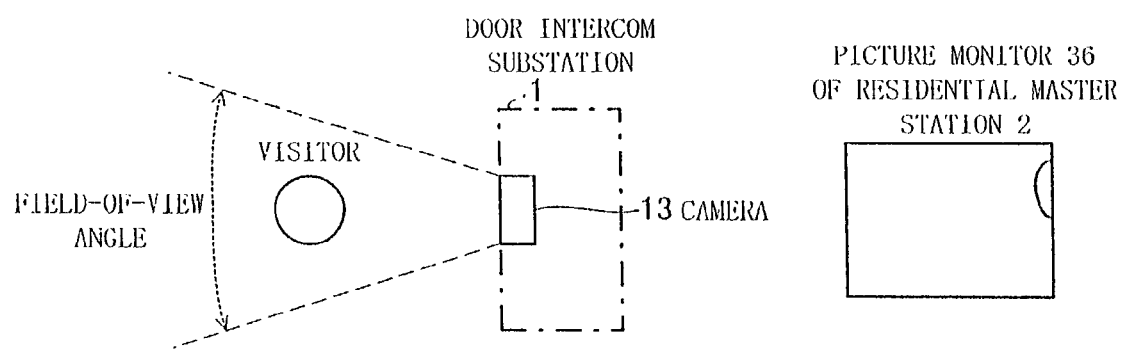
FIG. 4 is an operation explanatory view useful for explaining a picture imaging function of a door intercom substation constituting the television door intercom apparatus and a picture reproducing (displaying) function of a residential master station according to the first embodiment of the invention.

The camera 13 of the door intercom substation 1, its picture processing circuit 14 and its picture modulation circuit 15 are activated under the control of the substation CPU 10 in the call state on the basis of power (not shown and not explained in detail) supplied through the route opposite to the route of the call signal under the control of the master station CPU 30 in the call state that constitutes the residential master station 2. The substation CPU 10 detects the message signal S11 from the residential master station 2, activates the substation communication circuit 18 on the basis of the power source described above, outputs the message signal to the substation speaker 17 through the substation communication circuit 18 and lets the speaker 17 announce the message content ("Please stand in front of the door intercom substation") so that the visitor at the entrance confirming this message content can move into the range of the field-of-view angle of the camera 13 as shown in the operation explanatory view of FIG. 4. Here, the picture processing circuit 14 converts the picture of the visitor taken by the camera 13 to the electric signal and the picture modulation circuit 15 modulates the electric signal to the picture signal S21$a$. The picture signal S21$a$ is transmitted to the picture demodulation circuit 35 through the substation transmission I/F 19, the transmission line connection terminal P1, the transmission line L1, the transmission line terminal P2 of the residential master station 2 and the master station transmission I/F 41. The picture signal S21$b$ demodulated by this picture demodulation circuit is displayed on the picture monitor 36 as the picture existing inside the range of the field-of-view angle and having high recognition property. Incidentally, the substation communication circuit 18 of the door intercom substation 1 is inactivated under the control of the substation CPU 10 after the substation speaker 17 outputs the message content described above, and the output of the message content by the substation speaker is stopped.

The resident inside the house judges the visitor pushing the call button on the basis of the call sound through the master station speaker 39 of the residential master station 2 and the satisfactory picture displayed on the picture monitor 36, and pushes the communication on/off switch 37 to establish the call response communication. The master station communication circuit 40 is then activated under the control of the master station CPU 30 that detects the push operation and shifts from the call state to the communication state. The communication detection signal S31 from the master station CPU is transmitted to the substation CPU 10 of the door intercom substation 1 through the route opposite to that of the call signal.

Detecting the communication detection signal S31 from the residential master station 2, the substation CPU 10 of the door intercom substation 1 shifts from the call state to the communication state and activates the substation communication circuit 18. Consequently, the communication line is formed between the master station microphone 38 and the master station speaker 39 of the residential master station 2 used by the resident and the substation microphone 16 and the substation speaker 17 of the door intercom substation 1 used by the visitor. The communication (speak signals) can thus be exchanged through the communication line to establish the communication (bi-directional communication through the speakers; not explained in detail).

When the resident inside the house pushes (again) the communication on/off switch 37 to finish the communication with the visitor at the entrance, the master station CPU 30 detects this push operation, shifts from the communication state to the standby state, and controls and inactivates the picture demodulation circuit 35, the picture monitor 36 and the master station communication circuit 40. The communication end signal S32 from the master station CPU is transmitted to the substation CPU 10 of the door intercom substation 1 through the same route as that of the communication detection signal S31 described above.

The substation CPU 10 of the door intercom substation 1 detects the end communication detection signal S32 from the residential master station 2, shifts from the communication state to the standby state and inactivates the camera 13, the picture processing circuit 14, the picture modulation circuit 15 and the substation communication circuit 18. Consequently, the picture imaging function and the communication function of the door intercom substation 1 and the picture reproduction (displaying) function and the communication function of the residential master station 2 become inactive, and the television door intercom apparatus returns to the standby state.

According to the first embodiment of the invention described above, the message content read out from the message storage circuit 33 and outputted from the message transmission circuit 34 at the time of call at which the call operation is conducted at the entrance under the control of the master station call detection circuit 31 of the master station detection circuit 31 of the residential master station 2 detecting the call is outputted from the substation speaker 17 of the door intercom substation 1, and can urge the visitor to enter the range of the field-of-view angle of the camera 13. Therefore, the resident inside the house can more clearly recognize the visitor conducting the call operation at the entrance on the basis of the call sound from the master station speaker 39 and the picture displayed on the picture monitor 36 of the residential master station 2. In addition, security at the time of call and response such as when a stranger conducts the call, for example, can be improved.

Next, a television door intercom apparatus exhibiting a similar effect will be explained with reference to the accompanying drawings as a television door intercom apparatus according to the second embodiment of the invention.

Figure 2:
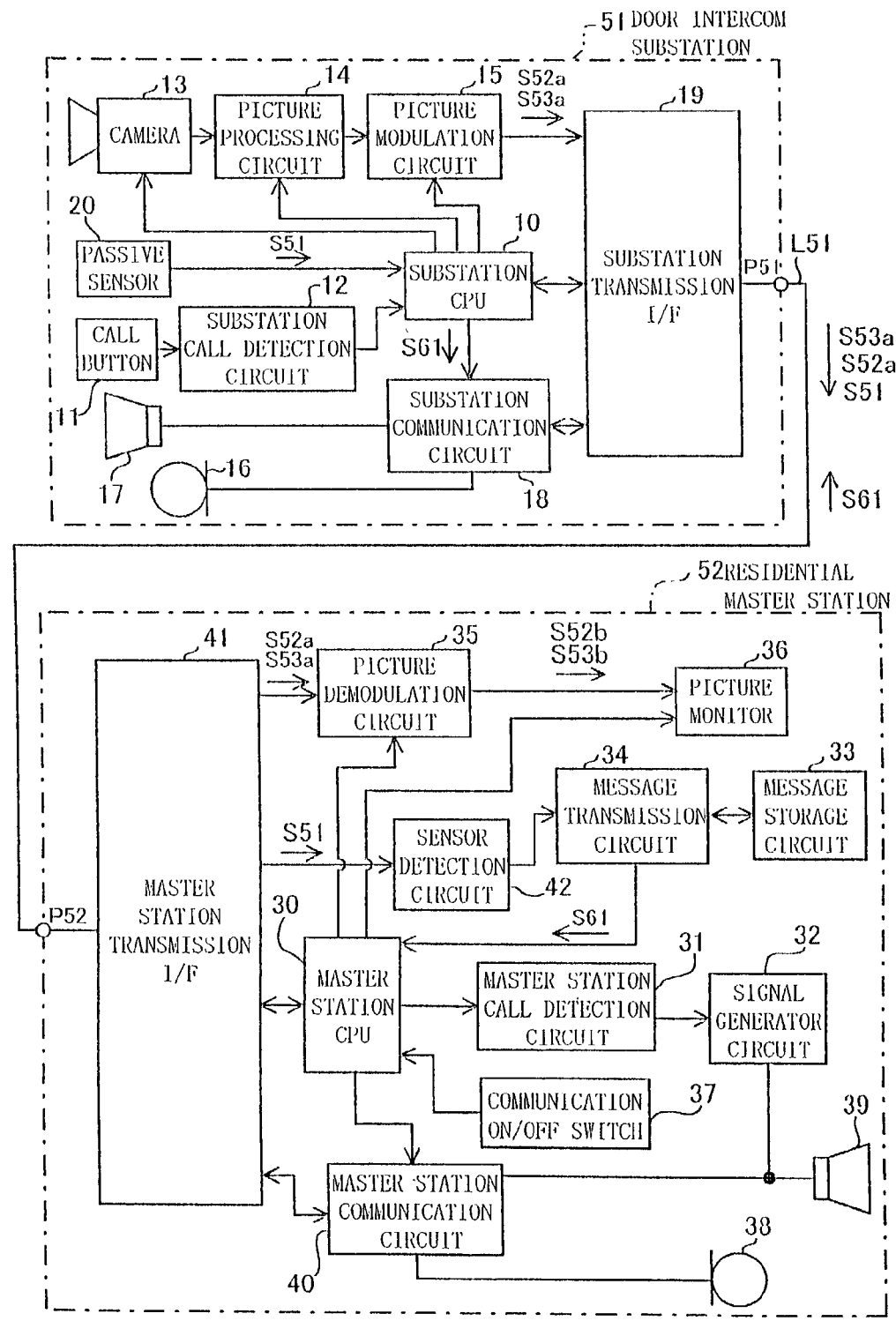
FIG. 2 is a block diagram showing a construction of a television door intercom apparatus according to a second embodiment of the invention.

FIG. 2 is a block diagram showing a construction of a television door intercom apparatus according to the second embodiment of the invention. In the door intercom apparatus of this embodiment, a door intercom substation 51 having a passive sensor 20 for checking whether or not the visitor exists within the range of the field-of-view angle of the camera 13 and outputting an out-of-field-of-view-angle signal to the substation CPU 10 when the visitor is out of the range of the field-of-view angle is added to the door intercom substation 1 installed at the entrance and. constituting the first embodiment (see the block diagram of FIG. 1), while a sensor detection circuit 42 for starting (activating) the message transmission circuit 34 is added to the residential master station 52 in place of the master station call detection circuit 31 that starts (activates) the message transmission circuit 34 in the first embodiment. The door intercom substation 51 and the residential master station 52 are connected to each other through a transmission line L51 using two wires.

The operation of the door intercom apparatus according to the second embodiment of the invention that has the construction described above will now be explained. Incidentally, the operation similar to that of the first embodiment will be omitted.

Figure 5:
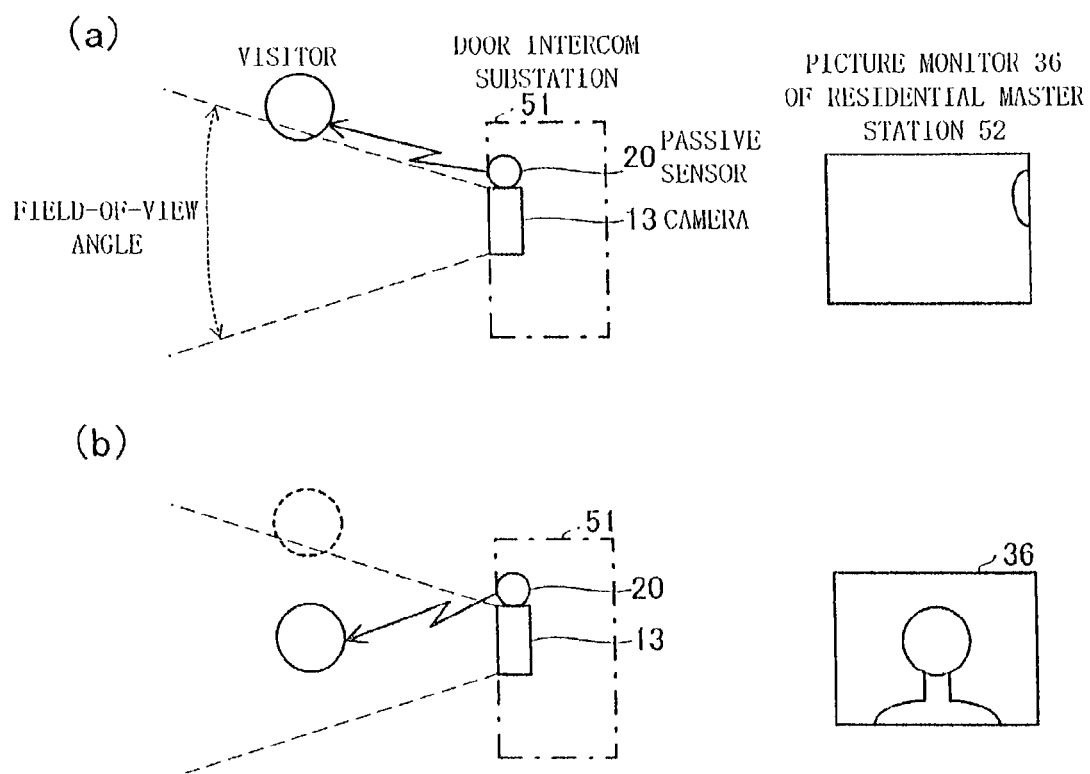
FIG. 5 is an operation explanatory view useful for explaining a picture imaging function of a door intercom substation constituting the television door intercom apparatus and a picture reproducing (displaying) function of a residential master station according to the second embodiment of the invention.

Referring to the block diagram of FIG. 2, when the visitor at the entrance pushes the call button 11 of the door intercom substation 51 to call the resident inside the house, the master station speaker 39 of the residential master station 52 outputs the call sound to notify the resident inside the house of the call. At the same time, the picture demodulation circuit 35 and the picture monitor 36 become active under the control of the master station CPU 30 in the call state, and the camera 13, the picture processing circuit 14, the picture modulation circuit 15 and the passive sensor 20 become active, too, under the control of the substation CPU 10 constituting the door intercom substation 51 in the call state (refer to the corresponding operation of the first embodiment). The passive sensor 20 detects whether or not the visitor conducting the call operation exists within the range of the field-of-view angle of the camera 13. When the visitor is out of the range of the field-of-view angle as shown in the operation explanatory view of FIG. 5(a), the out-of-field-of-view-angle signal S51 from the passive sensor is transmitted to the sensor detection circuit 42 through the substation CPU 10, the substation transmission I/F 19, the transmission line connection terminal P51, the transmission line L51, the transmission line connection terminal P52 of the residential master station 52 and the master station transmission I/F 41. Further, the picture of the visitor taken by the camera when the visitor is out of the range of the field-of-view angle is processed by the picture processing circuit 14 to the electric signal, is modulated by the picture modulation circuit 15 to the picture signal S52a and is thereafter transmitted to the picture modulation circuit 35 through the substation transmission I/F 19, the transmission line connection terminal P51, the transmission line L51, the transmission line connection terminal P52 of the residential master station 52 and the master station transmission I/F 41. The picture monitor 36 displays the picture of the visitor that is otherwise out of the range of the field-of-view angle of the camera 13 and has a low recognition factor.

The sensor detection circuit 42 of the residential master station 52 detects that the visitor conducting the call operation at the entrance is out of the range of the field-of-view angle of the camera 13 on the basis of the out-of-field-of-view-angle signal S51 from the door intercom substation 51 and activates the message transmission circuit 34. The message transmission circuit 34 reads out the predetermined message stored in the message storage circuit 33 such as the message containing the content "Please stand in front of the door intercom substation", and outputs the message signal S61 appropriately processed. This message S61 is transmitted to the substation CPU 10 through the master station CPU 30, the master station transmission I/F 41, the transmission line connection terminal P52, the transmission line L51, the transmission line connection terminal P51 of the door intercom substation 51 and the substation transmission I/F 19.

The substation CPU 10 of the door intercom substation 51 detects the message signal S61 from the residential master station 52, activates the substation communication circuit 18 on the basis of power (not shown and not explained in detail) supplied under the control of the master station CPU 30 in the call state and outputs the message signal to the substation speaker 17 through the substation communication circuit 18 to let it output the message content ("Please stand in front of the door intercom substation"). When the visitor at the entrance who confirms the message content from the substation speaker 17 moves into the range of the field-of-view angle of the camera 13 as shown in the operation explanatory view of FIG. 5, the passive sensor 20 stops outputting the out-of-field-of-view-angle signal S51 and the message transmission circuit 34 of the residential master station 52 stops outputting the message signal S61, too. The substation CPU 10 detects the stop of the output and renders the substation communication circuit 18 inactive. In consequence, the substation speaker 17 stops outputting the message content. Here, the picture of the visitor taken by the camera 13 and appropriately processed (modulation, demodulation, picture signals S53*a* and S53*b*) through the picture processing circuit 14, the picture demodulation circuit 15, the substation transmission I/F 19, the transmission line connection terminal P51, the transmission line L51, the transmission line connection terminal P52 of the residential master station 52, the master station transmission I/F 41 and the picture demodulation circuit 35 is displayed as the picture falling within the range of the field-of-view angle of the camera and having a high recognition factor on the picture monitor 36.

When the resident inside the house who judges the visitor conducting the call operation at the entrance on the basis of the call sound of the master station speaker 39 of the residential master station 52 and the excellent picture displayed on the picture monitor 36 pushes the communication on/off switch 37 to respond to the call and to establish the communication, the communication path is formed between the master station microphone 38 and the master station speaker 39 that are used by the resident and the substation microphone 16 and the substation speaker 17 of the door intercom substation 51 that are used by the visitor, and the sound (communication signal) is exchanged through this communication path, so that the communication (bi-directional communication through the sound) is established (refer to the corresponding operation of the first embodiment).

When the resident inside the house pushes (again) the communication on/off switch 37 to terminate the communication established between the resident and the visitor at the entrance, the picture taking function and the communication function of the door intercom substation 51 and the picture reproduction (displaying) function and the communication function of the residential master station 52 become inactive and the door intercom apparatus returns to the standby state (refer to the corresponding operation of the first embodiment).

According to the second embodiment of the invention described above, the passive sensor 20 detects whether or not the visitor conducting the call operation at the entrance exists within the range of the field-of-view angle of the camera 13 of the door intercom substation 51, and the sensor detection circuit 42 of the residential master station 52 detects that the visitor is out of the range of the field-of-view angle on the basis of the passive sensor. The message transmission circuit 34 reads out the message from the message storage circuit 33 under the control of this sensor detection circuit 42 and causes the substation speaker 17 of the door intercom substation 51 to output the content of this message so as to urge the visitor to move into the range of the field-of-view angle of the camera 13. Consequently, the resident inside the house can more satisfactorily recognize the visitor conducting the call operation at the entrance on the basis of the call sound of the master speaker 39 and the picture displayed on the picture monitor 36 of the residential master station 52. Further, security can be improved, too, when the resident responds to the call by a stranger, for example.

Next, a door intercom apparatus exhibiting a similar effect will be explained with reference to the accompanying drawings as a door intercom apparatus according to the third embodiment of the invention.

Figure 3:
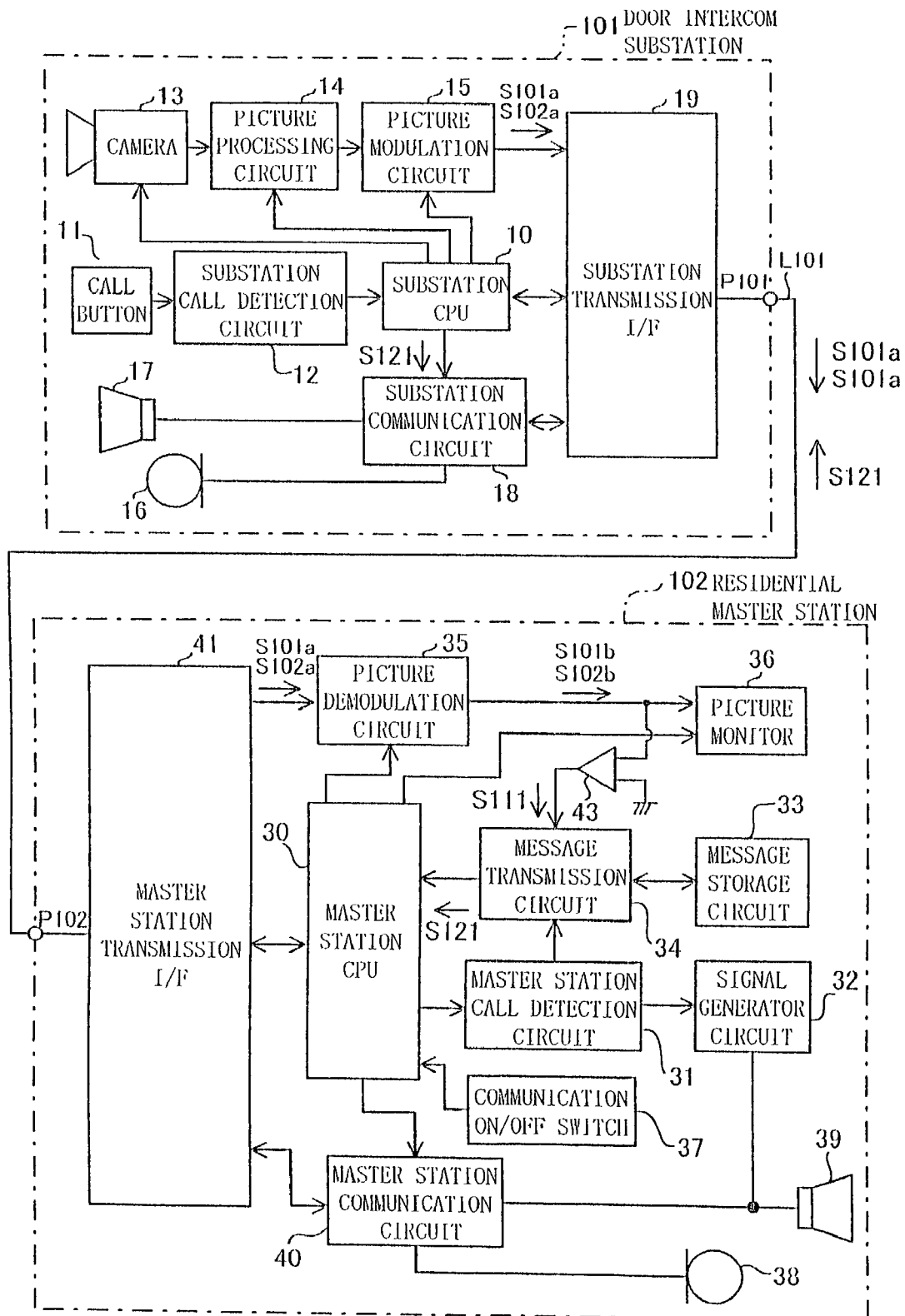
FIG. 3 is a block diagram showing a construction of a television door intercom apparatus according to a third embodiment of the invention.

FIG. 3 is a block diagram showing a construction of a door intercom apparatus according to the third embodiment of the invention. The door intercom apparatus of this embodiment includes a door intercom substation 101 installed at the entrance and having each constituent part similar to that of the door intercom substation 1 of the first embodiment (refer to the block diagram of FIG. 1) and a residential master station 102 of a modified construction. Namely, this residential master station 102 has a picture amount comparison circuit 43 added to each constituent part of the residential master station 2 of the first embodiment (refer to the block diagram of FIG. 1). The picture amount comparison circuit 43 judges that the visitor is out of the range of the field-of-view angle of the door intercom substation 101 when the picture amount of the visitor displayed on the picture monitor 36 is below a predetermined reference picture amount on the basis of the picture amount demodulated by the picture demodulation circuit 35, and outputs the out-of-field-of-view-angle signal to the message transmission circuit 34. Further, the picture amount comparison circuit 43 replaces the master station call detection circuit 31 that starts (activates) the message transmission circuit 34 in the first embodiment. The door intercom substation 101 and the residential master station 102 are connected to each other through a transmission line L101 using two wires.

The operation of the door intercom apparatus according to the third embodiment of the invention that has the construction described above will now be explained. Incidentally, the operation similar to those of the first and second embodiments of the invention will be omitted.

Referring to the block diagram of FIG. 3, when the visitor at the entrance pushes the call button 11 of the door intercom substation 101 to call the resident inside the house, the master station speaker 39 of the residential master station 102 outputs the call sound to notify the resident inside the house of the call. At the same time, the picture demodulation circuit 35 and the picture monitor 36 become active under the control of the master station CPU 30 in the call state, and the camera 13, the picture processing circuit 14 and the picture modulation circuit 15 become active, too, under the control of the substation CPU 10 constituting the door intercom substation 101 in the call state (refer to the corresponding operation of the first embodiment).

Figure 6:
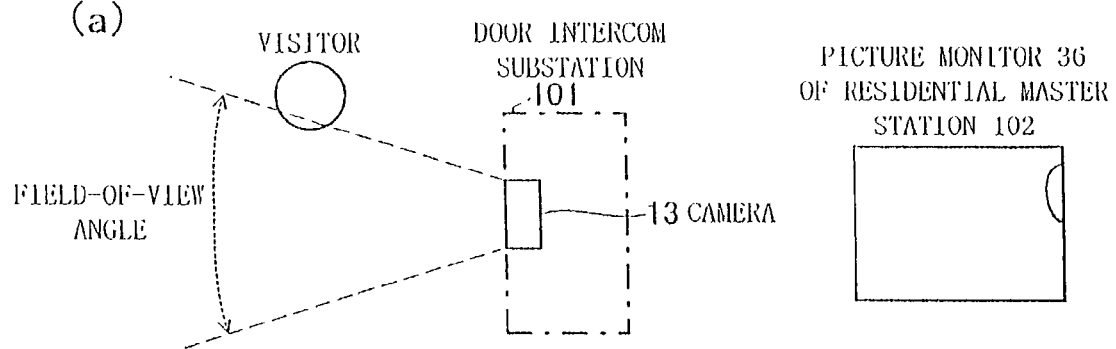
FIG. 6 is an operation explanatory view useful for explaining a picture imaging function of a door intercom substation constituting the television door intercom apparatus and a picture reproducing (displaying) function of a residential master station according to the third embodiment of the invention.
Figure 6:
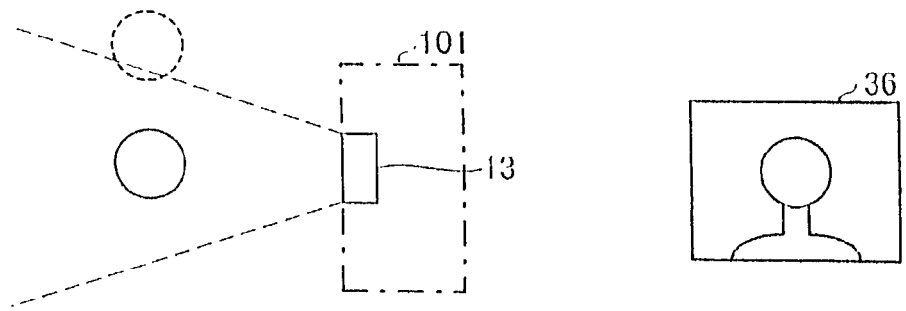
Figure 7:
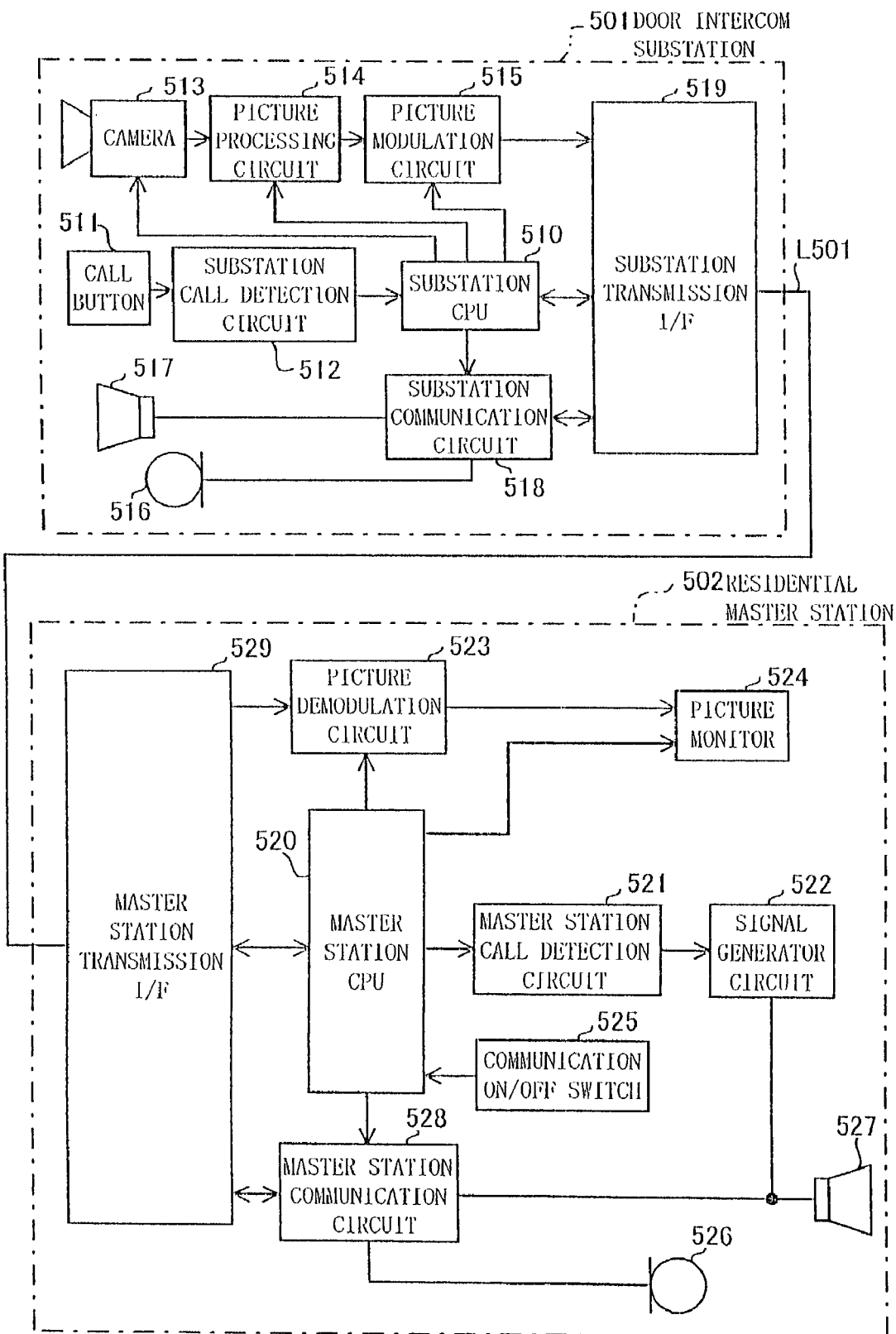
FIG. 7 is a block diagram showing a construction of a television door intercom apparatus according to the prior art.
Figure 8:
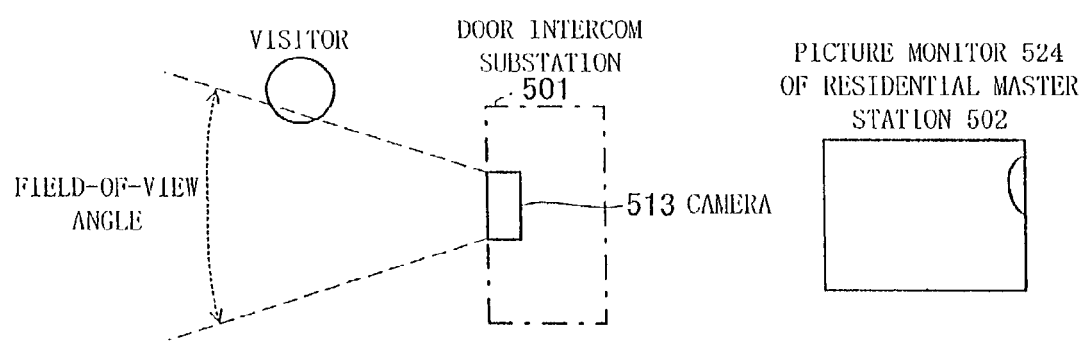
FIG. 8 is an operation explanatory view useful for explaining a picture imaging function of a door intercom substation constituting the television door intercom apparatus and a picture reproducing (displaying) function of a residential master station according to the prior art.

Here, when the visitor conducting the call operation at the entrance is out of the range of the field-of-view angle of the camera 13 of the door intercom substation 101 as shown in the operation explanatory view of FIG. 6(*a*), the picture is processed by the picture processing circuit 14 to the electric signal, is modulated by the picture modulation circuit 15 and is transmitted as the picture signal S101*a* to the picture demodulation circuit 35 through the substation transmission I/F 19, the transmission line connection terminal P101, the transmission line L101, the transmission line connection terminal P102 of the residential master station 102 and the master station transmission I/F 41. The picture demodulation circuit 35 demodulates the picture signal S101*a* from the door intercom substation 101 to the picture signal S101*b* and output the signal S101*b* to the picture monitor 36 and the picture quantity comparison circuit 43. Further, the picture monitor 36 displays the picture of the visitor taken by the camera 13 of the door intercom substation 101 that is out of the range of the field-of-view angle and has a low recognition factor as shown in the operation explanatory view of FIG. 6(*a*).

The picture amount comparison circuit 43 of the residential master station 102 compares the picture amount of the picture displayed on the picture monitor 36 with the predetermined reference picture amount on the basis of the picture signal S101*b* demodulated by the picture demodulation circuit 35, and judges whether or not the visitor conducting the call operation at the entrance is within the range of the field-of-view angle of the camera 13 of the door intercom substation 101. Here, the picture amount comparison circuit 43 judges that the visitor is out of the range of the field-of-view angle of the camera 13 because the picture amount of the picture displayed on the picture monitor 36 is smaller than the reference picture amount as shown in the operation explanatory view of FIG. 6(*a*). The message transmission circuit 34 detects the out-of-field-of-view-angle signal S111 from the picture amount comparison circuit 43, becomes active, reads out the predetermined message stored in advance in the message storage circuit 33 such as the message having the content "Please stand in front of the door intercom substation", and outputs the message signal S121 that is appropriately processed. This message signal S121 is transmitted to the substation CPU 10 through the master station CPU 30, the master station transmission I/F 41, the transmission line connection terminal P102, the transmission line L101, the transmission line connection terminal P101 of the door intercom substation 101 and the substation transmission I/F 19.

The substation CPU 10 of the door intercom substation 101 detects the message signal S121 from the residential master station 102, activates the substation communication circuit 18 on the basis of power (not shown and not explained in detail) supplied under the control of the master station CPU 30 in the call state and outputs the message signal to the substation speaker 17 through the substation communication circuit 18 to let it output the message content ("Please stand in front of the door intercom substation"). When the visitor at the entrance who confirms the message content from the substation speaker 17 moves into the range of the field-of-view angle of the camera 13 as shown in the operation explanatory view of FIG. 6(*b*), the picture monitor 36 displays the picture of the visitor taken by the camera 13, that is, the picture of the visitor inside the range of the field-of-view angle of the camera 13 and appropriately processed (modulation, demodulation, picture signals S102*a* and S102*b*) through the picture processing circuit 14, the picture demodulation circuit 15, the substation transmission I/F 19, the transmission line connection terminal P101, the transmission line L101, the transmission line connection terminal P102 of the residential master station 102, the master station transmission I/F 41 and the picture demodulation circuit 35, as the picture falling within the range of the field-of-view angle of the camera and having a high recognition factor on the picture monitor 36, as shown in the operation explanatory view of FIG. 6(*a*). Since the picture amount comparison circuit 43 judges that the picture amount displayed on the picture monitor 36 is greater than the reference picture amount, it stops outputting the-out-of-field-of-view-angle signal S111. In consequence, the message transmission circuit 34 stops outputting the message signal S121, too. Detecting the stop of the output, the substation CPU 10 controls the substation communication circuit 18 and renders it inactive. Therefore, the substation speaker stops outputting the message output.

When the resident inside the house who judges the visitor conducting the call operation at the entrance on the basis of the call sound of the master station speaker 39 and on the basis of the excellent picture displayed on the picture monitor 36 of the residential master station 102 pushes the communication on/off switch 37 to respond to the call and to establish the communication, the communication path is formed between the master station microphone 38 and the master station speaker 39 that are used by the resident and the substation microphone 16 and the substation speaker 17 of the door intercom substation 101 that are used by the visitor, and the sound (communication signals) is exchanged through this communication path. Therefore, the communication (bi-directional communication through the sound) is established (refer to the corresponding operation of the first embodiment).

When the resident inside the house pushes (again) the communication on/off switch 37 to terminate the communication established between the resident inside the house and the visitor at the entrance, the picture taking function and the communication function of the door intercom substation 101 and the picture reproduction (displaying) function and the communication function of the residential master station 102 become inactive and the door intercom apparatus returns to the standby state (refer to the corresponding operation of the first and second embodiments).

According to the third embodiment of the invention described above, the picture amount comparison circuit 43 detects whether or not the visitor conducting the call operation at the entrance exists within the range of the field-of-view angle of the camera 13 of the door intercom substation 101 on the basis of the picture amount of the picture displayed on the picture monitor 36 of the residential master station 102. The message transmission circuit 34 reads out the message from the message storage circuit 33 under the control of the out-of-field-of-view angle signal of the picture amount comparison circuit detecting that the visitor is out of the range of the field-of-view angle and lets the substation speaker 17 of the door intercom substation 101 output the content of this message so as to urge the visitor to move into the range of the field-of-view angle of the camera 13. Consequently, the resident inside the house can more satisfactorily recognize the visitor conducting the call operation at the entrance on the basis of the call sound of the master speaker 39 and the picture displayed on the picture monitor 36 of the residential master station 102. Further, security can be improved, too, when the resident responds to the call by a stranger, for example.

Incidentally, the first, second and third embodiments employ bi-directional communication using the master station microphone 38 and the master station speaker 39 of each residential master station 2, 52, 102 as means for establishing the communication between the resident inside the house and the visitor at the entrance. However, the embodiments can also employ bi-directional communication using a handset including a master station microphone and a master station receiver. In such a case, a loud speaker is provided separately as call report means for buzzing the call sound from the visitor to the residential master station, and a hook switch that is hooked on and off with the operation of the handset and is different from the communication on/off switch 37 is provided as means for responding to the call and for finishing the communication of the bi-directional communication. In consequence, the resident can establish the handset communication with the visitor.

INDUSTRIAL APPLICABILITY

As can be clearly understood from the explanation given above, the television door intercom apparatus according to the invention can urge the visitor to move into the range of the field-of-view angle of the camera by outputting the message content such as the message "Please stand in front of the door intercom substation", that is read out from the message storage circuit of the residential master station and is outputted from the message transmission circuit, by activating the substation speaker when the visitor conducts the call operation at the entrance or when the visitor is out of the range of the field-of-view angle of the camera of the door intercom substation. Therefore, the resident inside the house can more reliably recognize the visitor conducting the call operation at the entrance on the basis of the call sound outputted from the master station speaker and the picture displayed on the picture monitor of the residential master station and at the same time, security in responding to the call by a stranger, for example, can be improved.

What is claimed is:

1. A television door apparatus comprising:
a door intercom substation comprising:
  a call button;
  a substation microphone;
  a camera having a field-of-view angle; and
  a substation speaker; and
a residential master station comprising:
  a master station speaker;
  a call detection circuit for detecting a push operation of said call button by a visitor;
  a signal generator circuit for outputting a call sound through the master station speaker, responsive to detection of a push operation of said call button, so that communication can be established between (1) the substation microphone and the substation speaker and (2) the master station microphone and the master station speaker;
  a picture monitor for displaying a picture taken by said camera;
  a message storage circuit for storing in advance a predetermined message that urges the visitor conducting the push operation to stand in front of the door intercom substation and to move into range of the field-of-view angle of the camera; and
  a message transmission circuit, activated responsive to detection of a push operation, for causing said substation speaker to output the predetermined message from said message storage circuit.

2. A television door apparatus comprising:
a door intercom substation comprising:
  a call button;
  a substation microphone;
  a camera having a field-of-view angle;
  a substation speaker; and
  a passive sensor for outputting an out-of-field-of-view angle signal responsive to detection of a visitor outside the range of the field-of-view angle of said camera;
a residential master station comprising:
  a master station speaker;
  a call detection circuit for detecting a push operation of said call button by a visitor;
  a signal generator circuit for outputting a call sound through the master station speaker, responsive to detection of a push operation of said call button, so that communication can be established between (1) the substation microphone and the substation speaker and (2) the master station microphone and the master station speaker;
  a picture monitor for displaying a picture taken by said camera;
  a message storage circuit for storing in advance a predetermined message that urges the visitor conducting the push operation to stand in front of the door intercom substation and to move into range of the field-of-view angle of the camera; and
  a message transmission circuit, activated responsive to the out-of-field-of-view angle signal, for causing said substation speaker to output the predetermined message from said message storage circuit.

3. The television door apparatus according to claim 2 wherein said passive sensor stops outputting the out-of-field-of-view angle signal responsive to the visitor moving into the range of the field-of-view angle of said camera, whereby said message transmission circuit discontinues output of the predetermined message.

4. A television door apparatus comprising:
a door intercom substation comprising:
  a call button;
  a substation microphone;
  a camera having a field-of-view angle; and
  a substation speaker; and
a residential master station comprising:
  a master station speaker;
  a call detection circuit for detecting a push operation of said call button by a visitor;
  a signal generator circuit for outputting a call sound through the master station speaker, responsive to detection of a push operation of said call button, so that communication can be established between (1) the substation microphone and the substation speaker and (2) the master station microphone and the master station speaker;

a picture monitor for displaying a picture taken by said camera;

a picture amount comparison circuit for determining if an amount of a visitor pictured on said picture monitor is less than a predetermined reference picture amount and, if less than the predetermined reference picture amount is determined, outputting an out-of-field-of-view angle signal;

a message storage circuit for storing in advance a predetermined message that urges the visitor conducting the push operation to stand in front of the door intercom substation and to move into range of the field-of-view angle of the camera; and a message transmission circuit, activated responsive to the out-of-field-of-view angle signal, for causing said substation speaker to output the predetermined message from said message storage circuit.

5. The television door apparatus according to claim 4 wherein said picture amount comparison circuit, responsive to a determination that the amount of the visitor pictured on said picture monitor is greater than the predetermined reference picture amount, discontinues output of the out-of-field-of-view angle signal, whereby said message transmission circuit stops output of the predetermined message.

* * * * *